Figure 1:
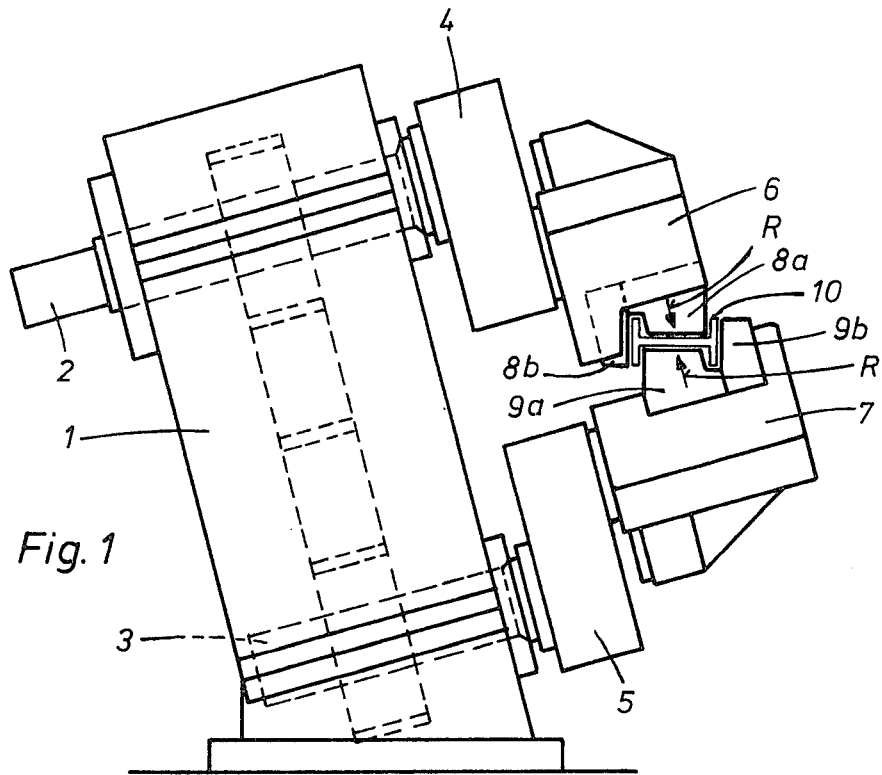

United States Patent [19]

Hansen et al.

[11] 4,092,891
[45] June 6, 1978

[54] APPARATUS FOR CUTTING STEEL SECTIONS

[75] Inventors: Manfred W. Hansen, Düsseldorf; Emil F. Kersting, Ratingen, both of Germany

[73] Assignee: Sack GmbH, Düsseldorf, Germany

[21] Appl. No.: 786,133

[22] Filed: Apr. 11, 1977

[30] Foreign Application Priority Data

Apr. 15, 1976 Germany .............................. 2616809

[51] Int. Cl.² .............................................. B23D 35/00
[52] U.S. Cl. ........................................ 83/341; 83/345; 83/554; 83/673; 83/694
[58] Field of Search ................ 83/341, 345, 673, 674, 83/694

[56] References Cited

U.S. PATENT DOCUMENTS 3,466,961  9/1969  Konovalov et al. .................. 83/694

Primary Examiner—J. M. Meister
Attorney, Agent, or Firm—John J. Dennemeyer

[57] ABSTRACT

Apparatus for cutting rolled steel sections with a web and one or more flanges angled in respect to the web as profiled cutters movable relative to each other on a common axis and kept parallel to each other at the time of cut. The cutter edges for cutting the web of the section extend in an inclined manner at an acute angle with respect to a plane at right-angles to the axis of travel of the cutters. These cutter edges which extend to follow the shape of the flanges at least as far as these extensions are located inside the projection of the section on the normal plane.

6 Claims, 3 Drawing Figures

APPARATUS FOR CUTTING STEEL SECTIONS

The invention relates to shears for cutting steel sections, in particular rolled stell sections with a web and with flanges extending at an angle to the web, for example rolled H and U steel sections, by means of profiled cutters moving relative to each other and which are kept parallel to each other at the time of the cut. Rolled H and U steel sections can only be cut with very unsatisfactory results on known shears with profiled cutters. Damage to the sections at the cutting points is generally so great that constant difficulties occur at the time of subsequent treatment. In the case of cutters moved at right-angles to the section to be cut, the flanges are crushed on the narrow sides and are torn after separation of the web. Hitherto, attempts have been made to provide assistance such that the upper cutter was constructed wider than the internal dimension of the section and it was taken into account that the flanges are turned upwards. Thus, the lower half of the flanges is torn as before, but not cut.

Even so-called "punching shears" do not improve this cutting geometry substantially and furthermore lead to very high cutting forces.

In particular, the invention is based on the technique employed in rolling mills, which on account of the afore-mentioned difficulties, when cutting rolled steel sections by means of profiled cutters, provides the use of saws for separating difficult sections, unless sections of this type are rolled in the rolling mill solely in cooling bed lengths. Both solutions are no longer acceptable for modern rolling mills with high production, even when flying saws are used.

The object of the invention is to provide shears for cutting steel sections by means of profiled cutters, whose cutting geometry provides the least possible deformation or damage to the material to be cut at the cutting point. In this respect, the invention is directed both to upright cutting shears as well as flying shears, when, even when using the shears according to the invention in the rolling mill for the afore-mentioned reasons, the flying shears are located in the foreground.

According to the invention the cutter edges for cutting the web of the section extend in an inclined manner at an acute angle $\alpha$ with respect to a plane at right-angles to this axis at the time of the cut, and extensions of the cutter edges following the shape of the flanges of the section at least as far as these extensions are located inside the projection of the section on the plane, such that the cutter edges associated with the flanges form an angle (s) with respect to the plane, whereby the flanges are cut over their full height from their outer surfaces. In this case, apart from the fact that the edges of the cutters largely follow the contours of the section to be cut, the inclination of all the cutter edges with respect to the plane at right-angles to the direction of movement of the cutters is essential, in which case it is irrelevant whether only one cutter or both cutters are driven. It is thus ensured that the flanges of the rolled section are cut in a draw cut over their entire flange thickness and flange height. Thus, the narrow sides of the flanges are not compressed, since a cutter edge engages from the outer side of a flange for the draw cut.

For cutting a section with flanges extending at right-angles to the web, the two angles ($\alpha$, $\beta$) are complementary angles. The size of the acute angle of inclination between the web or the cutter edges associated with the web and the plane at right-angles to the direction of movement should be chosen in an optimum manner according to the dimensions of the section to be cut. The cutter stroke of the shears is limited to the effect that the cutter edges separating the flanges do not overlap or only slightly at the time of the cut.

In this respect, all the features of the invention can be used even in the case of shears cutting in an upright position. When used with a construction as flying shears comprising a device for keeping the cutters parallel during the cut, the shears replace the flying saws hitherto conventional in rolling mills, with the invaluable advantage that rolled steel sections, in particular H and U sections can be divided cleanly into cooling bed lenghts at rolling speed, so that high billet weights can be introduced and the economy and productivity of the rolling mill is increased.

For adjusting the acute angle between the course of the cutter edges for the section web and the direction of movement of the cutters in a manner dependent on the material to be cut, it may be advantageous to arrange the entire shears to pivot about a pivot extending in the longitudinal direction of the material to be cut.

Figure 2:
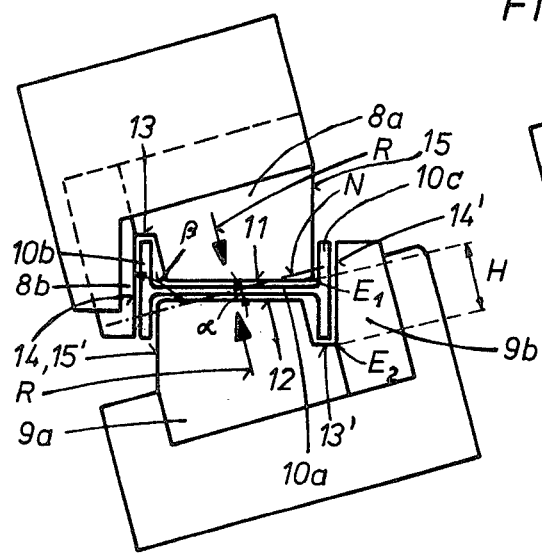
Figure 3:
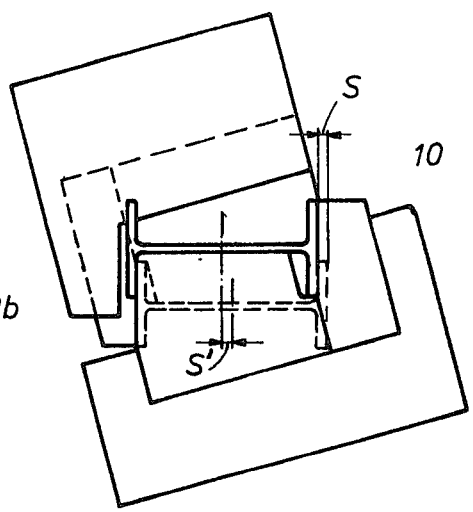

One embodiment of shears according to the invention is illustrated in the drawings and in particular FIG. 1 shows flying parallel crank shears in side view parallel to the direction of travel of the material to be cut, for cutting an H steel section, FIG. 2 is an enlarged illustration of the cutting region in order to explain the cutting geometry and FIG. 3 is an illustration according to FIG. 2, after the completed cut.

FIG. 1 shows the obliquely inclined housing 1 of flying parallel crank shears 1 with cutter shafts 2 and 3 inclined with respect to the horizontal, to which rotating crank arms 4, 5 are attached. Cutter supports 6, 7 are mounted to rotate freely on the cranks arranged eccentrically with respect to the drive shafts 2, 3, a two-part upper cutter 8a, 8b being attached to the upper cutter support 6 and a two-part lower cutter 9a, 9b to the lower cutter support 7. The cutter supports 6, 7 rotating at the time of rotation of the drive shafts 2, 3 keep the cutters parallel during the cut in a manner which is not shown in detail, in the embodiment of parallel crank shears by a further housing located behind the plane of the drawing with crank arms 4, 5 rotating in synchronism, from whose crank pins connecting rods extend, which are respectively pivotally connected to a cutter support 6, 7.

The rolled H steel section 10 to be cut is supplied by way of a rollway with horizontal rollers, so that its web is located horizontally and its flanges vertically. The arrows R indicate the direction of movement of the cutters moving towards each other, which direction is inclined by an acute angle with respect to the horizontal cutting plane — compared with the web of the section —, which results in the inclination of the cutter shafts 2, 3 as well as that of the housing 1.

The cutting geometry in conjunction with the inclined direction of movement R of the cutters is shown in detail in FIGS. 2 and 3. For this, the normal plane N is taken as the reference plane, to which the direction of movement R extends at right-angles. It will be seen that the parallel cutter edges 11, 12 associated with the web 10a of the rolled steel section 10 extend in an inclined manner at an acute angle $\alpha$ with respect to the normal plane N.

These cutter edges 11, 12 follow the contour of the material to be cut as far as possible. For cutting the flange 10b located on the left, the cutter edge 11 for example is set back to form a cutter edge 13, which is associated with the upper narrow side of the flange 10b. The transition from the cutter edge 11 to the cutter edge 13 must extend parallel to the direction of movement R, since the flange 10b has a back taper with respect to this direction of movement of the cutters. In the transition to the partial cutter 8b, the cutting edge 13 continues as a cutting edge 14 which extends parallel to the outer surface of the flange 10b over the entire height of the flange. As regards the flange 10c located on the right, the cutter edge 11 continues as the cutting edge 15 parallel to the inner surface of the upper half 10c of the flange.

The continuation of the lower cutting edge 12 of the lower cutter part 9a is formed as a mirror image of that of the upper cutter with the corresponding cutting edges 13', 14' and 15'. Thus, all cutting edges extend at an acute or obtuse angle with respect to the direction of movement R, due to which the flanges 10b and 10c of the steel section 10 in particular are separated in a clean manner by the draw cut.

The draw cut through the flanges of the steel section 10 takes place at an angle $\beta$ between the cutting edges 14 and 14' with respect to the normal plane N, the angles $\alpha$ and $\beta$ being complementary angles, when the steel section has flanges extending at right-angles to the web.

FIGS. 1 and 2 show the relationship of the cutters shortly before the beginning of the cut. The choice of the angle $\alpha$ appropriately depends on the requirement that the corner point $E_1$ between the edges 11 and 15 is located in the same vertical plane parallel to the direction of movement R as the deepest corner point E2 on the lower cutter between the edges 13' and 14'. The cutting stroke H of the cutters does not need to be greater than the distance between the two corner points $E_1$ and $E_2$. It is apparent from the geometry that with the cutter stroke H, the cutting edges 15 and 14' coincide, whereof the cutting stroke at right-angles to the flange 10c thus corresponds to its flange thickness S.

FIG. 3 shows the relationship of the cutters after the completed cut, the steel section 10 in the original position being shown in full line. The broken lines represent a plan view of the separated end face of the steel section. The drawing shows a lateral deflection of the steel section after the cut by the order of magnitude of S', which corresponds to the flange thickness S and is so small that it can be taken up by the flexibility of the material to be cut. The vertical deflection at the time of the cut is even less than in straight cutting shears, namely only one quarter of the flange height.

What is claimed is:

1. Apparatus for cutting rolled steel sections with a web and one or more flanges extending at an angle to the web, said apparatus comprising profiled cutters movable relative to each other on a common axis and kept parallel to each other at the time of the cut, the cutter edges for cutting the web of the section extending in an inclined manner at an acute angle ($\alpha$) with respect to a plane (N) at right-angles to said axis at the time of the cut, and extensions of the cutter edges following the shape of the flanges of the section at least as far as these extensions are located inside the projection of the section on said plane, such that the cutter edges associated with the flanges form an angle ($\beta$) with respect to said plane, whereby the flanges are cut over their full height from their outer surfaces.

2. Apparatus according to claim 1, wherein, for cutting a section with flanges extending at right-angles to the web, the two angles ($\alpha$, $\beta$) are complementary angles.

3. Apparatus according to claim 1, wherein the acute angle ($\alpha$) is measured such that a corner point at which a cutter edge associated with the web passes into a cutter edge following the inner contour of a flange is located in the same plane parallel to said axis of movement of the cutter as a corner point of the cutter edge of the counter-cutter for the same flange, which is generally remote from said plane (N).

4. Apparatus according to claim 3, wherein the cutter stroke corresponds exactly to the distance between the two corner points.

5. Apparatus according to claim 1, constructed as flying shears with a device for keeping the cutters constantly parallel during the cut.

6. Apparatus according to claim 5, wherein, for adjusting the acute angle ($\alpha$), the entire shears are arranged to pivot about a pivot point extending in the longitudinal direction of the material to be cut.

* * * * *